US008223174B2

(12) United States Patent
Kumakura et al.

(10) Patent No.: US 8,223,174 B2
(45) Date of Patent: Jul. 17, 2012

(54) WHITE BALANCE CORRECTION CIRCUIT AND CORRECTION METHOD FOR DISPLAY APPARATUS THAT DISPLAYS COLOR IMAGE BY CONTROLLING NUMBER OF EMISSIONS OR INTENSITY THEREOF IN ACCORDANCE WITH PLURALITY OF PRIMARY COLOR VIDEO SIGNALS

(75) Inventors: Ken Kumakura, Kawasaki (JP); Hideaki Ohki, Yokohama (JP); Yuichiro Kimura, Kawasaki (JP); Yasuji Noguchi, Kawasaki (JP); Takayuki Ooe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 12/232,680

(22) Filed: Sep. 22, 2008

(65) Prior Publication Data

US 2009/0040148 A1 Feb. 12, 2009

Related U.S. Application Data

(62) Division of application No. 09/722,621, filed on Nov. 28, 2000, now Pat. No. 7,439,941.

(30) Foreign Application Priority Data

Mar. 8, 2000 (JP) ................................ 2000-063991

(51) Int. Cl.
*G09G 5/10* (2006.01)
*G09G 3/28* (2006.01)
*H04N 9/73* (2006.01)

(52) U.S. Cl. .......................... 345/690; 345/63; 348/655

(58) Field of Classification Search ............. 345/60–72, 345/690

See application file for complete search history.

(56) References Cited

U.S. PATENT DOCUMENTS

| | | | | |
|---|---|---|---|---|
| 4,193,095 | A | 3/1980 | Mizushima | |
| 4,751,566 | A | 6/1988 | Pilot | |
| 5,181,103 | A | 1/1993 | Aoyama | |
| 5,315,378 | A * | 5/1994 | Satou et al. | 348/655 |
| 5,526,059 | A | 6/1996 | Lee et al. | |
| 5,757,343 | A * | 5/1998 | Nagakubo | 345/63 |

(Continued)

FOREIGN PATENT DOCUMENTS

JP 03-238497 10/1991

(Continued)

OTHER PUBLICATIONS

Office Action mailed from the Japanese Patent Office on Sep. 16, 2008.

(Continued)

*Primary Examiner* — Alexander S Beck
*Assistant Examiner* — Charles V Hicks
(74) *Attorney, Agent, or Firm* — Staas & Halsey LLP

(57) ABSTRACT

A display apparatus, which displays a color image by controlling the number of emissions or the intensity thereof in accordance with primary color video signals input thereto, has a detection portion and a white balance correction portion. The detection portion is used to detect the number of emissions or the intensity, and the white balance correction portion is used to correct white balance by adjusting the amplitudes of the primary color video signals in accordance with the detected number of emissions or the detected intensity. Therefore, correct white balance can be maintained regardless of the number of emissions or the intensity of emission.

7 Claims, 16 Drawing Sheets

U.S. PATENT DOCUMENTS

| | | | | |
|---|---|---|---|---|
| 5,856,823 | A | 1/1999 | Kimoto et al. | |
| 5,936,602 | A | 8/1999 | Tsuchida et al. | |
| 5,943,032 | A | 8/1999 | Nagaoka et al. | |
| 6,014,258 | A | 1/2000 | Naka et al. | |
| 6,034,655 | A | 3/2000 | You | 345/60 |
| 6,101,271 | A | 8/2000 | Yamashita et al. | |
| 6,304,238 | B1 | 10/2001 | Tsuchida | |
| 6,400,347 | B1 | 6/2002 | Kang | |
| 6,597,333 | B2 | 7/2003 | Todoroki et al. | |
| 6,741,227 | B2 | 5/2004 | Naka et al. | |
| 2002/0044105 | A1 | 4/2002 | Nagai | |
| 2003/0011626 | A1 | 1/2003 | Tanabe et al. | |
| 2004/0189551 | A1 | 9/2004 | Matsumoto | |
| 2008/0068405 | A1 | 3/2008 | Kumakura et al. | |

FOREIGN PATENT DOCUMENTS

| | | |
|---|---|---|
| JP | 8-9415 | 1/1996 |
| JP | 8-051642 | 2/1996 |
| JP | 8-223507 | 8/1996 |
| JP | 8-286636 | 11/1996 |
| JP | 9-281927 | 10/1997 |
| JP | 9-319331 | 12/1997 |
| JP | 10-13848 | 1/1998 |
| JP | 10-333639 | 12/1998 |
| JP | 2000-020013 | 1/2000 |
| JP | 2001-255843 | 9/2001 |

OTHER PUBLICATIONS

Office Action mailed Mar. 26, 2010 in co-pending related U.S. Appl. No. 11/980,623.

Extended European Search Repot issued Oct. 31, 2008 in corresponding European Patent Application No. 07116252.3.

Office Action mailed Aug. 27, 2010 in co-pending related U.S. Appl. No. 11/980,623.

Office Action mailed Jan. 6, 2011 in co-pending related U.S. Appl. No. 11/980,623.

Notice of Allowance mailed Jun. 2, 2011 in co-pending related U.S. Appl. No. 11/980,623.

Office Action mailed Dec. 9, 2011 in co-pending related U.S. Appl. No. 13/137,694.

* cited by examiner

RELATIONSHIP BETWEEN THE NUMBER OF EMISSIONS AND LUMINANCE

UNIT EMISSION LUMINANCE CHARACTERISTICS DUE TO DECREASE OF ENERGY CONVERSION EFFICIENCY

Fig.15

GRAY LEVEL SMALL ⟶ LARGE

NUMBER OF EMISSIONS SMALL ⟶ LARGE

| GRAY LEVEL | | A | B | C | D | E | F |
|---|---|---|---|---|---|---|---|
| NUMBER OF EMISSIONS (NUMBER OF TIMES) | P1 | Fa | Fb | Fc | Fd | Fe | Ff |
| | P2 | 2×Fa | 2×Fb | 2×Fc | 2×Fd | 2×Fe | 2×Ff |
| | P3 | 3×Fa | 3×Fb | 3×Fc | 3×Fd | 3×Fe | 3×Ff |
| | P4 | 4×Fa | 4×Fb | 4×Fc | 4×Fd | 4×Fe | 4×Ff |
| | P5 | 5×Fa | 5×Fb | 5×Fc | 5×Fd | 5×Fe | 5×Ff |
| | ⋮ | ⋮ | ⋮ | ⋮ | ⋮ | ⋮ | ⋮ |
| | ⋮ | ⋮ | ⋮ | ⋮ | ⋮ | ⋮ | ⋮ |

WHITE BALANCE CORRECTION CIRCUIT AND CORRECTION METHOD FOR DISPLAY APPARATUS THAT DISPLAYS COLOR IMAGE BY CONTROLLING NUMBER OF EMISSIONS OR INTENSITY THEREOF IN ACCORDANCE WITH PLURALITY OF PRIMARY COLOR VIDEO SIGNALS

CROSS-REFERENCE TO RELATED APPLICATIONS

This application is a divisional of U.S. application Ser. No.: 09/722,621, filed Nov. 28, 2000,now U.S. U.S. Pat. No. 7,439,941 claiming the benefit of priority from prior Japanese Patent Application No. 2000-063991, filed Mar. 8, 2000, the entire contents of both of which are incorporated herein by reference.

BACKGROUND OF THE INVENTION

1. Field of the Invention

The present invention relates to a display apparatus that displays a color image by controlling the number of emissions or the intensity thereof in accordance with a plurality of primary color video signals input to it, and more particularly to a technique for correcting white balance in a plasma display apparatus that displays a color image by controlling the number of emissions of phosphors of three primary colors, red, green, and blue.

2. Description of the Related Art

Recently, research and development of various types of display apparatus has been proceeding; among them, the plasma display panel (PDP) has been attracting attention as a large screen flat display apparatus capable of crisply displaying characters, images, etc.

The plasma display panel achieves a color display by exciting phosphors of three primary colors, red, green, and blue and, in order to limit power consumption, for example, it is practiced to control the number of emissions (the number of sustain emissions) in accordance with image display ratio (Average Picture Level—APL). However, the luminance ratio among the respective color phosphors varies with the number of emissions; therefore, even when white balance is adjusted, for example, at a specified number of emissions, if the number of emissions changes, the white balance is shifted.

This white balance shift problem occurs due to changes in the number of emissions or the intensity of emission, not only in plasma display panels but also in various other display apparatuses such as display apparatuses using EL elements (electroluminescent elements), FEDs (field emission displays), LED (light emitting diode) displays, and CRTs (cathode ray tubes). Therefore, in a display apparatus that displays a color image by controlling the number of emissions or the intensity thereof in accordance with a plurality of primary color video signals input to it, it is necessary to maintain correct white balance regardless of the number of emissions or the intensity of emission.

Namely, phosphors of the three primary colors, red, green, and blue saturate in luminance as the number of emissions increases. This is because the persistence characteristics of the red, green, and blue phosphors, in other words, the energy conversion efficiency of the phosphors for excitation by ultraviolet radiation, decreases as the number of emissions increases. If white balance is adjusted at a specific point (A) where the number of emissions is large, the white balance value at that time is determined based on the luminance ratio among red, green, and blue at the specific point. On the other hand, when displaying an image in accordance with high APL video signals, the number of emissions is reduced in order to hold the power consumption within a predetermined value.

Accordingly, at another point (B) where the number of emissions is small, the energy conversion efficiency of the phosphors for excitation by ultraviolet radiation increases. If the rate of decrease of the energy conversion efficiency increases in the order of green, red, and blue, then the luminance increases relative to that at the specific point, in the order of green, red, and blue. That is, there is a difference in white balance between the specific point (A) and another point (B) because the luminance ratio among red, green, and blue at the other point (B) differs from the value used for adjustment at the specific point (A).

Conversely, when displaying an image in accordance with video signals whose APL is lower than that when the white balance was adjusted, the number of emissions may be increased, resulting in a further decrease in the energy conversion efficiency, and causing a difference in white balance because the luminance ratio among red, green, and blue changes, as in the case where the number of emissions is decreased.

The prior art and the problem associated with the prior art will be described in detail later with reference to accompanying drawings.

Though the present invention can be applied not only to plasma display apparatuses but also to various other display apparatuses such as display apparatuses using EL elements, FEDs, and CRTs, the following description will be given by dealing primarily with a plasma display apparatus as an example of a display apparatus that uses phosphors of three primary colors, red, green, and blue, whose persistence characteristics differ from one another.

SUMMARY OF THE INVENTION

An object of the present invention is to provide a white balance correction circuit and correction method, for a display apparatus, capable of maintaining correct white balance regardless of the number of emissions or the intensity of emission.

According to the present invention, there is provided a display apparatus for displaying a color image by controlling the number of emissions or the intensity thereof in accordance with primary color video signals input thereto, comprising a detection portion detecting the number of emissions or the intensity; and a white balance correction portion correcting white balance by adjusting the amplitudes of the primary color video signals in accordance with the detected number of emissions or the detected intensity.

The detection portion may detect the number of emissions or the intensity from a display ratio of an image produced by the primary color video signals. The display apparatus may further comprise a control portion controlling the number of emissions for, or the intensities of, the primary color video signals in accordance with the display ratio of the image. The white balance correction portion may comprise a computing unit and a plurality of multipliers wherein the computing unit may compute amplitude coefficients for the primary color video signals in accordance with the display ratio of the image, and the multipliers may multiply the primary color video signals respectively by the computed amplitude coefficients.

The white balance correction portion may comprise a storage unit and a plurality of multipliers wherein the storage unit may output amplitude coefficients for the primary color video signals in accordance with the display ratio of the image, and the multipliers may multiply the primary color video signals respectively by the amplitude coefficients output from the storage unit. The white balance correction portion may comprise a storage unit wherein the storage unit may output amplitude-adjusted primary color video signals in accordance with the primary color video signals and the display ratio of the image.

The detection portion may detect the number of emissions or the intensity from a display current that flows when displaying an image in accordance with the primary color video signals. The display apparatus may further comprise a control portion controlling the number of emissions for, or the intensities of, the primary color video signals in accordance with the image display current. The white balance correction portion may comprise a computing unit and a plurality of multipliers wherein the computing unit may compute amplitude coefficients for the primary color video signals in accordance with the image display current, and the multipliers may multiply the primary color video signals respectively by the computed amplitude coefficients.

The white balance correction portion may comprise a storage unit and a plurality of multipliers wherein the storage unit may output amplitude coefficients for the primary color video signals in accordance with the image display current, and the multipliers may multiply the primary color video signals respectively by the amplitude coefficients output from the storage unit. The white balance correction portion may comprise a storage unit wherein the storage unit may output amplitude-adjusted primary color video signals in accordance with the primary color video signals and the image display current. The detection portion may detect the number of emissions or the intensity from an external applied luminance-adjusting input.

The display apparatus may further comprise a control portion controlling the number of emissions for, or the intensities of, the primary color video signals in accordance with the externally applied luminance-adjusting input. The white balance correction portion may comprise a computing unit and a plurality of multipliers wherein the computing unit may compute amplitude coefficients for the primary color video signals in accordance with the externally applied luminance-adjusting input, and the multipliers may multiply the primary color video signals respectively by the computed amplitude coefficients. The white balance correction portion may comprise a storage unit and a plurality of multipliers wherein the storage unit may output amplitude coefficients for the primary color video signals in accordance with the externally applied luminance-adjusting input, and the multipliers may multiply the primary color video signals respectively by the amplitude coefficients output from the storage unit.

The white balance correction portion may comprise a storage unit wherein the storage unit may output amplitude-adjusted primary color video signals in accordance with the primary color video signals and the externally applied luminance-adjusting input. Emissions due to the primary color video signals may be produced from phosphors of three primary colors, red, green, and blue. The display apparatus may be a plasma display apparatus.

According to the present invention, there is also provided a display apparatus for displaying a color image by controlling the number of emissions or the intensity thereof in accordance with primary color video signals input thereto, wherein output gray levels of images represented by the primary color video signals are adjusted in accordance with input gray levels of the images represented by the primary color video signals, thereby correcting white balance which varies with the number of emissions for, or the intensities of, the primary color video signals.

The display apparatus may further comprise a first detection portion detecting the input gray levels of the images represented by the primary color video signals; and a correction portion correcting the white balance by adjusting the output gray levels of the primary color video signals in accordance with the detected input gray levels. The white balance correction portion may comprise a computing unit and a plurality of correction units wherein the computing unit may compute gray level correction coefficients in accordance with the detected input gray levels, and the correction units may apply corrections to the input gray levels by using the computed correction coefficients.

The white balance correction portion may comprise a storage unit and a plurality of correction units wherein the storage unit may output gray level correction coefficients in accordance with the detected input gray levels, and the correction units may apply corrections to the input gray levels by using the computed correction coefficients. The display apparatus may further comprise a second detection portion detecting a display ratio or display current of an image produced by the primary color video signals; and a control portion controlling the number of emissions for, or the intensities of, the primary color video signals in accordance with the detected display ratio or the detected display current.

Further, according to the present invention, there is provided a white balance correction circuit for use in a display apparatus which displays a color image by controlling the number of emissions or the intensity thereof in accordance with primary color video signals input thereto, and which includes a detection portion detecting the number of emissions or the intensity, wherein the white balance correction circuit corrects white balance by adjusting the amplitudes of the primary color video signals in accordance with the detected number of emissions or the detected intensity.

The white balance correction circuit may further comprise a computing unit computing amplitude coefficients for the primary color video signals in accordance with the number of emissions or the intensity; and a plurality of multipliers multiplying the primary color video signals respectively by the computed amplitude coefficients wherein the white balance, which varies with the number of emissions for, or the intensities of, the primary color video signals, may be corrected by adjusting the amplitudes of the primary color video signals in accordance with the controlled number of emissions or the controlled intensity. The white balance correction circuit may further comprise a storage unit storing amplitude coefficients for the primary color video signals, and outputting the amplitude coefficients in accordance with the number of emissions or the intensity; and a plurality of multipliers multiplying the primary color video signals respectively by the output amplitude coefficients wherein the white balance, which varies with the number of emissions for, or the intensities of, the primary color video signals, may be corrected by adjusting the amplitudes of the primary color video signals in accordance with the controlled number of emissions or the controlled intensity.

The white balance correction circuit may further comprise a computing unit computing amplitude coefficients for the primary color video signals in accordance with the number of emissions or the intensity; and wherein the white balance, which varies with the number of emissions for, or the intensities of, the primary color video signals, may be corrected by adjusting the amplitudes of the primary color video signals in accordance with the controlled number of emissions or the controlled intensity. The white balance correction circuit may further comprise a storage unit storing amplitude-adjusted primary color video signals, and outputting the amplitude coefficients in accordance with the primary color video signals and the number of emissions or the intensity; and wherein the white balance, which varies with the number of emissions for, or the intensities of, the primary color video signals, may be corrected by adjusting the amplitudes of the primary color video signals in accordance with the controlled number of emissions or the controlled intensity.

The detection portion may detect the number of emissions or the intensity from a display ratio of an image produced by the primary color video signals. The detection portion may detect the number of emissions or the intensity from a display current that flows when displaying an image in accordance with the primary color video signals. The detection portion may detect the number of emissions or the intensity from an externally applied luminance-adjusting input.

In addition, according to the present invention, there is provided a white balance correction circuit for use in a display apparatus which displays a color image by controlling the number of emissions or the intensity thereof in accordance with primary color video signals input thereto, and which includes a detection portion detecting the number of emissions or the intensity, wherein output gray levels of images represented by the primary color video signals are adjusted in accordance with input gray levels of the images represented by the primary color video signals, thereby correcting white balance which varies with the number of emissions for, or the intensities of, the primary color video signals.

The white balance correction circuit may further comprise a first detection portion detecting the input gray levels of the images represented by the primary color video signals; and a correction portion correcting the white balance by adjusting the output gray levels of the primary color video signals in accordance with the detected input gray levels. The white balance correction circuit may further comprise a computing unit computing gray level correction coefficients in accordance with the detected input gray levels; and a plurality of correcting units for applying corrections to the input gray levels by using the computed correction coefficients. The white balance correction circuit may further comprising a storage unit outputting gray level correction coefficients in accordance with the detected input gray levels; and a plurality of correcting units for applying corrections to the input gray levels by using the output correction coefficients.

The white balance correction circuit may further comprise a second detection portion detecting a display ratio or display current of an image produced by the primary color video signals; and a control portion controlling the number of emissions for, or the intensities of, the primary color video signals in accordance with the detected display ratio or the detected display current.

According to the present invention, there is provided a white balance correction method for a display apparatus which displays a color image by controlling luminance in accordance with primary color video signals input thereto, wherein an amplitude ratio between the primary color video signals is set in accordance with the luminances of the primary color video signals, thereby suppressing variation of white balance with the luminances.

Further, according to the present invention, there is provided a white balance correction method for a display apparatus which displays a color image by controlling the number of emissions or the intensity thereof in accordance with primary color video signals input thereto, wherein the number of emissions or the intensity is detected; and white balance is corrected by adjusting the amplitudes of the primary color video signals in accordance with the detected number of emissions or the intensity.

The number of emissions or the intensity may be detected from a display ratio of an image produced by the primary color video signals. The white balance correction method may further comprise the step of controlling the number of emissions for, or the intensities of, the primary color video signals in accordance with the display ratio of the image. The number of emissions or the intensity may be detected from a display current that flows when displaying an image in accordance with the primary color video signals. The white balance correction method may further comprise the step of controlling the number of emissions for, or the intensities of, the primary color video signals in accordance with the image display current.

The number of emissions or the intensity may be detected from an externally applied luminance-adjusting input. The white balance correction method may further comprise the step of controlling the number of emissions for, or the intensities of, the primary color video signals in accordance with the externally applied luminance-adjusting input.

In addition, according to the present invention, there is provided a white balance correction method for a display apparatus which displays a color image by controlling the number of emissions or the intensity thereof in accordance with primary color video signals input thereto, wherein output gray levels of images represented by the primary color video signals are adjusted in accordance with input gray levels of the images represented by the primary color video signals, thereby correcting white balance which varies with the number of emissions for, or the intensities of, the primary color video signals.

The white balance correction method may further comprise the steps of detecting the input gray levels of the images represented by the primary color video signals; and adjusting the output gray levels of the primary color video signals in accordance with the detected input gray levels. The white balance correction method may further comprise the step of controlling the number of emissions for, or the intensities of, the primary color video signals in accordance with a display ratio or display current of the image.

According to the present invention, there is provided a white balance correction method for a display apparatus which displays a color image by controlling luminance in accordance with primary color video signals input thereto, wherein an amplitude ratio between the primary color video signals is set in accordance with the luminances of the primary color video signals, thereby suppressing variation of white balance with the luminances.

The luminances of the primary color video signals may be defined by the number of emissions for, or the intensities of, the primary color video signals. A color image may be displayed by means of light-emitting elements in accordance with luminance-defined primary color video signals.

Further, according to the present invention, there is also provided a white balance correction circuit for use in a display apparatus which displays a color image using primary color video signals, comprising an adjusting unit adjusting the amplitude of each of the primary color video signals; a storage unit storing an amplitude ratios for correcting the amplitudes of the primary color video signals; and a setting unit setting in the adjusting unit amplitude ratios stored in the storage unit wherein the amplitude ratio between the primary color video signals is set in accordance with the number of emissions for, or the intensities of, the primary color video signals, thereby correcting white balance which varies with the number of emissions for, or the intensities of, the primary color video signals.

In addition, according to the present invention, there is provided a white balance correction circuit for use in a display apparatus which displays a color image using primary color video signals, comprising an adjusting unit adjusting the amplitude of each of the primary color video signals; a computing unit computing an amplitude ratio for each of the primary color video signals from the number of emissions for, or the intensities of, the primary color video signals; and a setting unit setting in the adjusting unit the amplitude ratio computed by the computing unit wherein the amplitude ratio between the primary color video signals is set in accordance with the number of emissions for, or the intensities of, the primary color video signals, thereby correcting white balance which varies with the number of emissions for, or the intensities of, the primary color video signals.

BRIEF DESCRIPTION OF THE DRAWINGS

The present invention will be more clearly understood from the description of the preferred embodiments as set forth below with reference to the accompanying drawings, wherein:

FIG. 15 is a diagram (part 1) showing the relationship between a gray level and a number of emissions.

DETAILED DESCRIPTION OF THE PREFERRED EMBODIMENTS

Before describing in detail the preferred embodiments of the white balance correction circuit, the correction method, and the display apparatus according to the present invention, a prior art display technique and the problem associated with the prior art will be described with reference to FIGS. 1 to 5B.

Figure 1:
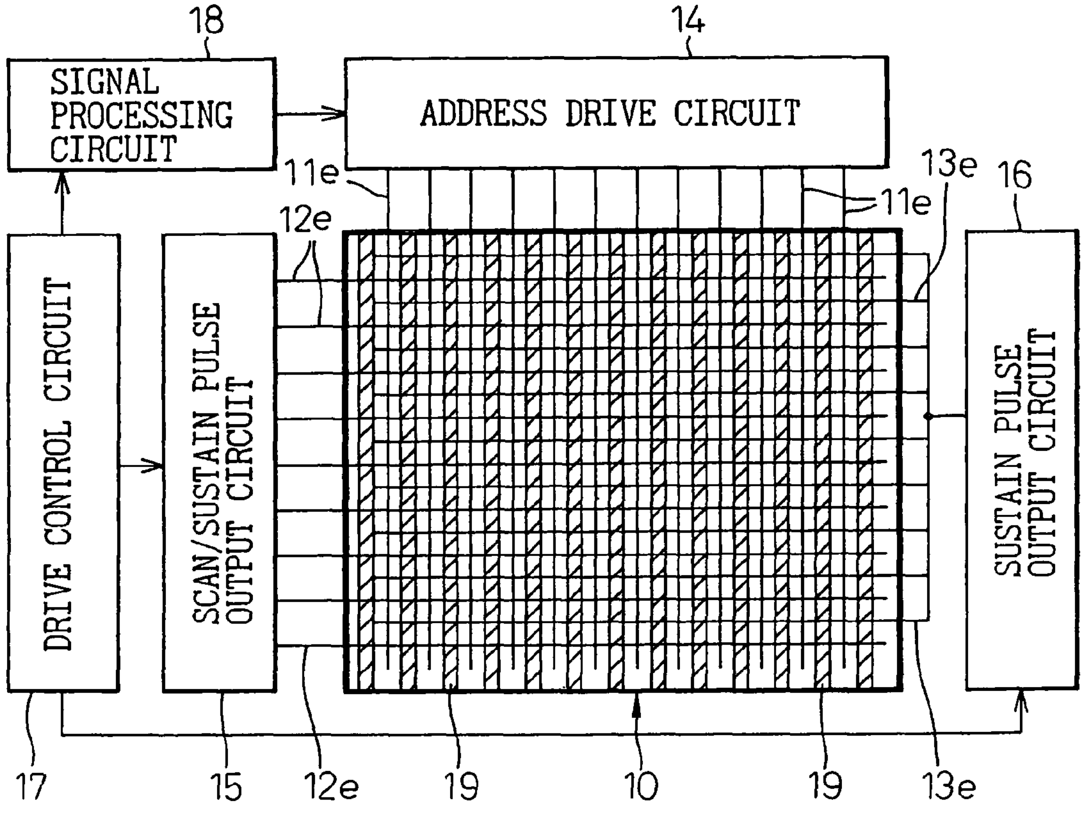
Fig.1 (PRIOR ART)
FIG. 1 is a block diagram schematically showing one example of a surface discharge AC-driven type plasma display apparatus.

FIG. 1 is a block diagram schematically showing one example of a surface discharge AC-driven type plasma display apparatus. In FIG. 1, reference numeral 10 is a display panel, 11 is an array of address electrodes, 12 is an array of scan/sustain electrodes, 13 is an array of sustain electrodes, 14 is an address drive circuit, 15 is a scan/sustain pulse output circuit, 16 is a sustain pulse output circuit, 17 is a drive control circuit, 18 is a signal processing circuit, and 19 is a barrier.

As shown in FIG. 1, the plasma display apparatus comprises: the display panel 10 having the address electrodes 11, scan/sustain electrodes 12, sustain electrodes 13, and barriers 19; the address drive circuit 14 for driving the address electrodes 11; the scan/sustain pulse output circuit 15 for driving the scan/sustain electrodes 12; the sustain pulse output circuit 16 for driving the sustain electrodes; the drive control circuit 17 for controlling these output circuits; and the signal processing circuit 18 for processing input signals.

The display panel 10 includes two opposing glass plates, on one of which are arranged the address electrodes 11 and on the other are arranged the scan/sustain electrodes 12 and sustain electrodes 13. The space sandwiched between the two glass plates is partitioned by the barriers 19 into smaller spaces each of which forms a discharge cell.

Each discharge cell is filled with a rare gas such as He—Xe or Ne—Xe. When a voltage is applied to its associated scan/sustain electrode 12 and sustain electrode 13, a discharge occurs, and ultraviolet rays are generated. Each discharge cell has a phosphor coating which glows in red, green, or blue, and the ultraviolet rays excite the phosphor to emit colored light corresponding to the color of the phosphor. By utilizing this light emission and selecting discharge cells of the desired colors in accordance with video signals, a color image can be displayed.

In accordance with the display ratio (or display current) of the image produced by the video signals (three primary color video signals R, G, and B), the drive control circuit 17 controls the number of emissions for the video signals via the scan/sustain pulse output circuit 15 and sustain pulse output circuit 16 so that power consumption does not exceed a predetermined value.

Figure 2:
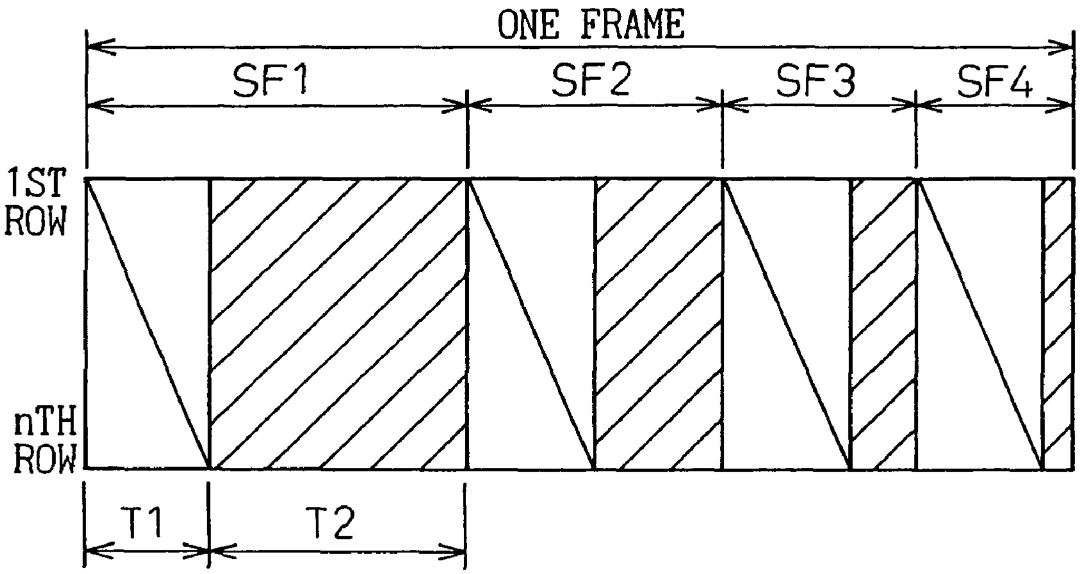
Fig.2 (PRIOR ART)
FIG. 2 is a diagram for explaining one example of a driving sequence in the plasma display apparatus of FIG. 1.

FIG. 2 is a diagram for explaining one example of a driving sequence in the plasma display apparatus of FIG. 1, that is, a time-division driving method (hereinafter referred to as the subfield method) utilizing the above-described emission principle.

The subfield method is a method that divides one frame into a plurality of subfields (SF1 to SF4) differently weighted according to the difference in the number of emissions, and reproduces a grayscale by selecting for each pixel a subfield appropriate to the signal amplitude representing the pixel.

The driving sequence based on the subfield method shown in FIG. 2 shows an example in which one frame is divided into four subfields SF1 to SF4 to display 16 gray levels. Scan period T1 of each subfield is a period for selecting a discharge cell (hereinafter called a light-emitting cell) that emits light in the subfield, and discharge sustain period T2 is a period for the duration of which the selected light-emitting cell emits light.

The discharge sustain period T2 of each of the subfields SF1 to SF4 represents the length of time during which the selected cell emits light, and the periods of the respective subfields are weighted in the ratio 8:4:2:1 according to the number of emissions. By selecting an appropriate one of the subfields SF1 to SF4 in accordance with the video signal level, $2^4=16$ gray levels can be reproduced. If it is desired to increase the number of gray levels, the number of subfields is increased; for example, if the number of subfields is increased to 8, $2^8=256$ gray levels can be reproduced. The luminance level of each subfield is controlled by the number of sustain emissions (number of emissions).

Figure 3A:
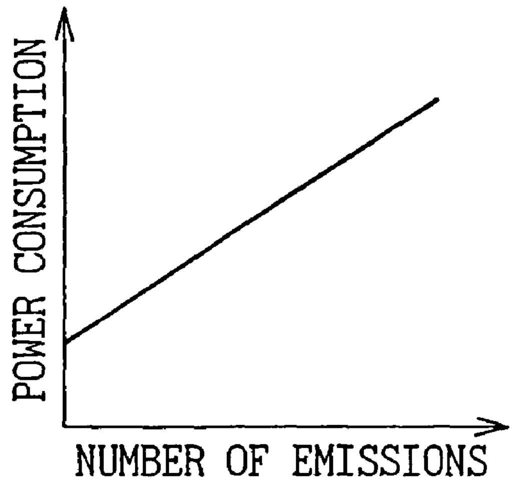
Fig.3A (PRIOR ART)
FIGS. 3A, 3B, and 3C are diagrams for explaining the relationships between average picture level (APL), number of emissions, and power consumption in the plasma display apparatus of FIG. 1.
Figure 3B:
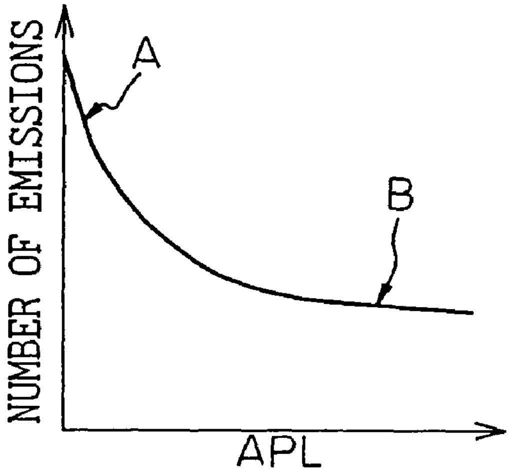
Fig.3B (PRIOR ART)
Figure 3C:
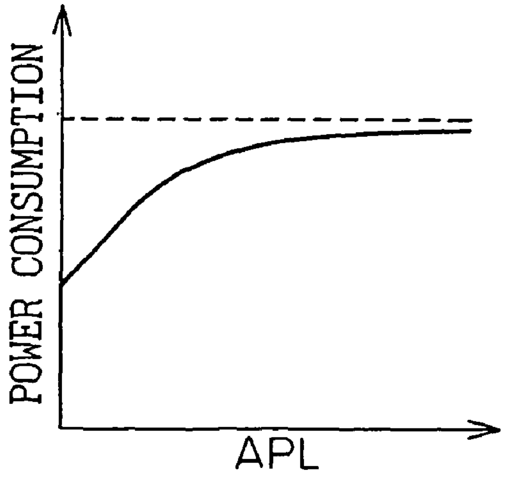
Fig.3C (PRIOR ART)

FIGS. 3A, 3B, and 3C are diagrams for explaining the relationships between average picture level (APL), number of emissions, and power consumption in the plasma display apparatus of FIG. 1: FIG. 3A shows the relationship between the number of emissions of a light-emitting cell and the power consumption, FIG. 3B shows the relationship between the average picture level (APL) of an image (display panel) and the number of emissions, and FIG. 3C shows the relationship between the average picture level of an image produced by video signals and the power consumption.

As shown in FIG. 3A, the power consumption of the plasma display apparatus increases as the number of emissions of the display cell increases. In view of this, in practical plasma display apparatuses, when the average picture level (APL) of an image is high, that is, when displaying an image (video signals) such that the light emission level is high over the entire screen, control is performed to limit the power consumption within a predetermined value, as shown in FIG. 3C, by limiting the number of emissions for the frame as a whole while maintaining the weighting ratio defining the number of emissions for each subfield.

That is, in FIG. 3B, if the number of gray levels displayed is 256, then if the weighting ratio at point A is, for example, 512:256:128:64:32:16:8:4, the number of emissions at point A is 1020, and if the weighting ratio at point B is, for example, 128:63:32:16:8:4:2:1, the number of emissions at point B is limited to 255. That is, when the number of emissions is controlled according to the APL, if the APL increases, the power consumption of the plasma display apparatus is held within the predetermined level, a shown in FIG. 3C.

Figure 4:
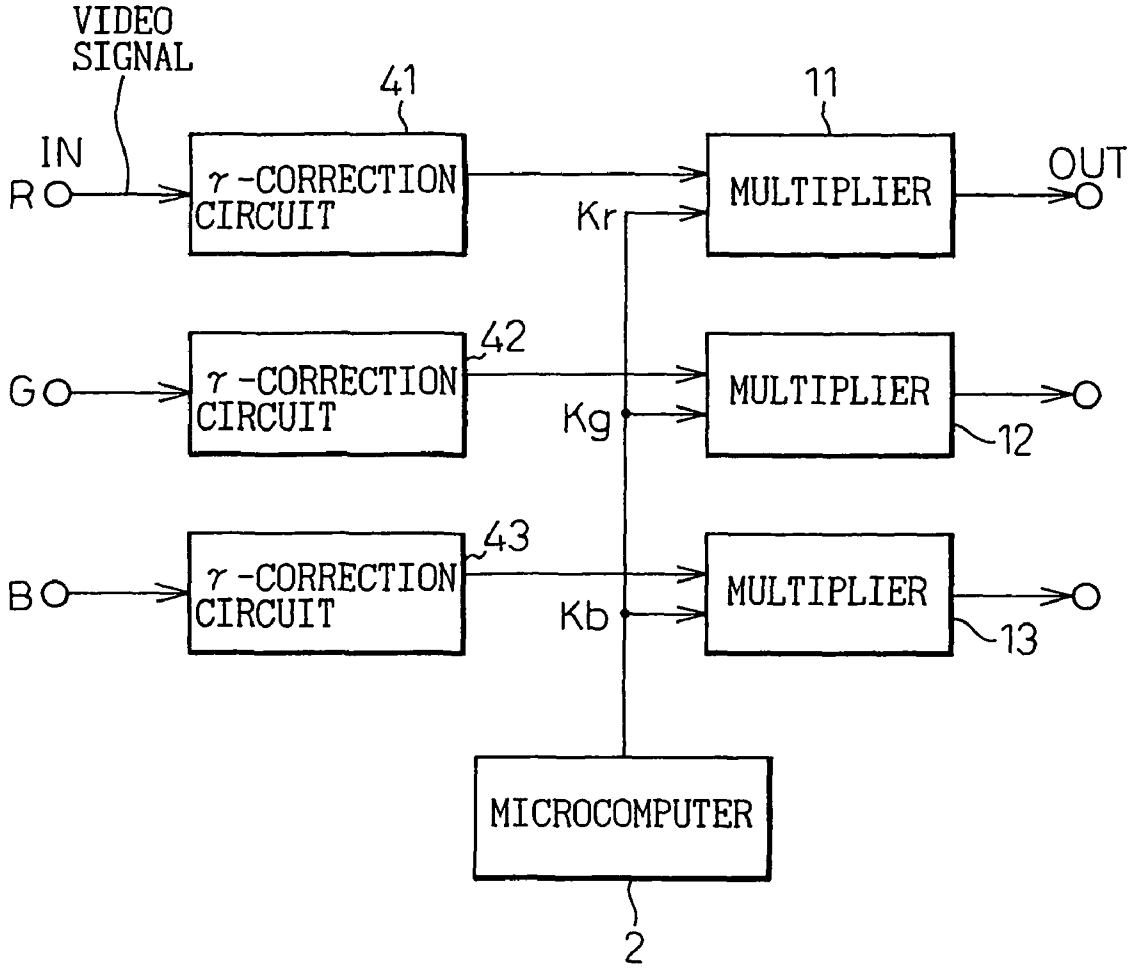
Fig. 4 (PRIOR ART)
FIG. 4 is a block diagram showing one example of a prior art white balance adjusting circuit.

FIG. 4 is a block diagram showing one example of a prior art white balance adjusting circuit. In FIG. 4, reference numerals 11 to 13 are multipliers, 2 is a microcomputer, and 41 to 43 are γ-correction circuits.

As shown in FIG. 4, in the prior art white balance adjusting circuit, input video signals R, G, and B are gamma-corrected by the respective gamma-correction circuits 41 to 43, and then the gamma-corrected signals are supplied to the respective multipliers 11 to 13 where the video signals are multiplied by coefficients (amplitude coefficients) Kr, Kg, and Kb, respectively, supplied from the microcomputer 2. That is, the microcomputer 2 supplies to the respective multipliers 11 to 13 the coefficients Kr, Kg, and Kb for the respective color video signals R, G, and B in order to adjust the white balance by changing the luminance ratio of red, green, and blue. Here, the coefficients Kr, Kg, and Kb may be the same or may be different, depending on the respective color video signals R, G, and B. More specifically, the prior art white balance adjusting circuit adjusts the white balance by supplying the coefficients Kr, Kg, and Kb from the microcomputer 2 to the respective multipliers 11 to 13 and thereby controlling the signal amplitudes of the respective video signals R, G, and B.

In the case of the prior art white balance adjusting circuit, in order to adust the white balance a prescribed adjustment pattern (for example, a window pattern or the like) is displayed with a specified number of emissions and the amplitudes of the respective color video signals R, G, and B are adjusted so that the desired white balance can be obtained. That is, white balance is adjusted for each set (plasma display apparatus), for example, prior to shipment from the factory; in that case, a prescribed adjustment pattern is displayed with a specified number of emissions and, in that state, the coefficients Kr, Kg, and Kb are stored in the registers in the microcomputer 2.

In the prior art white balance adjusting circuit, since the white balance is adjusted by displaying a prescribed adjustment pattern with a specified APL (that is, with a specified number of emissions), as described above, the white balance may become shifted when the number of emissions (APL) changes.

Figure 5A:
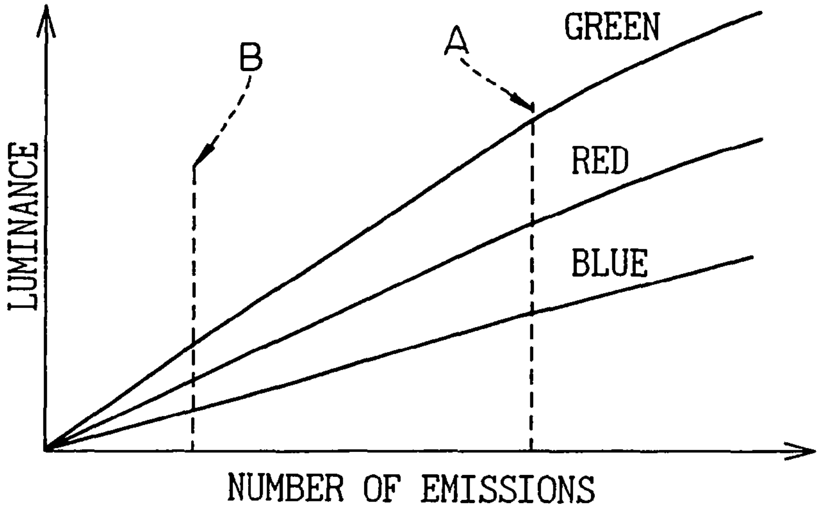
Fig.5A (PRIOR ART)
FIGS. 5A and 5B are diagrams showing the relationship between the number of emissions and luminance for phosphors of three primary colors, red, green, and blue.
Figure 5B:
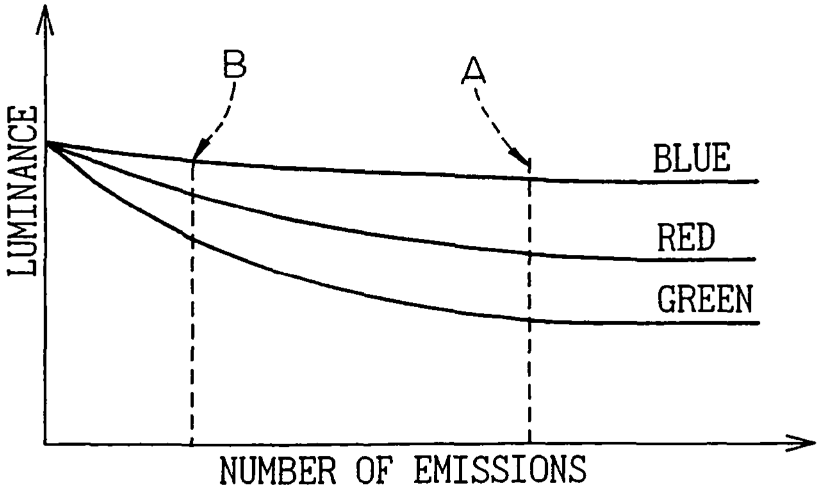
Fig.5B (PRIOR ART)

FIGS. 5A and 5B are diagrams showing the relationship between the number of emissions and luminance for the phosphors of three primary colors, red, green, and blue: FIG. 5A shows the relationship between the number of emissions and luminance, and FIG. 5B shows unit emission luminance characteristics due to the decrease of energy conversion efficiency.

As shown in FIG. 5A, the phosphors of the three primary colors, red, green, and blue begin to saturate in luminance as the number of emissions increases. This is because the persistence characteristics of the red, green, and blue phosphors, in other words, the energy conversion efficiency of the phosphors for the excitation by ultraviolet radiation, decrease as the number of emissions increases, as shown in FIG. 5B. In FIG. 5B, the vertical axis represents the value of the luminance per unit emission normalized to the emission luminance per unit when the energy conversion efficiency is highest, and the horizontal axis represents the number of emissions.

Here, in FIGS. 5A and 5B, if white balance is adjusted at point A where the number of emissions is large, the white balance value at that time is determined based on the luminance ratio among red, green, and blue at point A. On the other hand, when displaying an image in accordance with high APL video signals, the number of emissions is reduced in order to hold the power consumption within a predetermined value, as previously described.

Accordingly, at point B where the number of emissions is small, the energy conversion efficiency of the phosphors for the excitation by ultraviolet radiation increases as shown in FIG. 5B; here, if the rate of decrease of the energy conversion efficiency increases in the order of green, red, and blue, then the luminance increases relative to that at point A, in the order of green, red, and blue. That is, there is a difference in white balance between point A and point B because the luminance ratio among red, green, and blue at point B differs from the value used for adjustment at point A.

Conversely, when displaying an image in accordance with video signals whose APL is lower than that when the white balance was adjusted, the number of emissions may be increased, resulting in a further decrease in the energy conversion efficiency, and causing a difference in white balance because the luminance ratio among red, green, and blue changes, as in the case where the number of emissions is decreased.

Specific embodiments of the white balance correction circuit, the correction method, and the display apparatus according to the present invention will now be described below with reference to drawings. In the description of the embodiments hereinafter given, a plasma display apparatus is taken as an example, but it will be appreciated that the present invention is applicable not only to plasma display apparatuses, but also to various other display apparatuses such as display apparatuses using EL elements, FEDs, LED displays, and CRTs.

Figure 6:
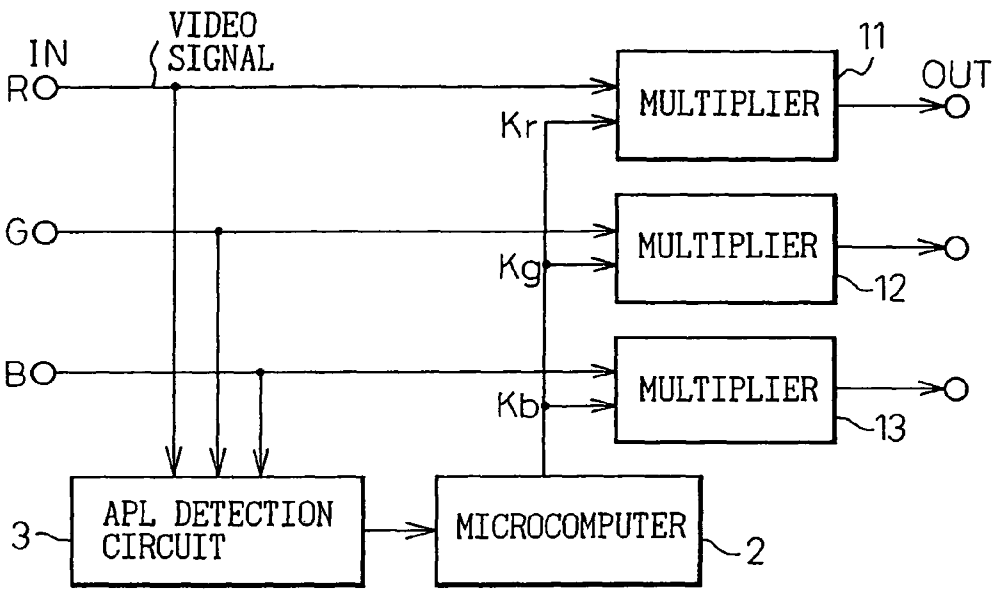
FIG. 6 is a block diagram showing a first embodiment of a white balance correction circuit according to the present invention.
Figure 7:
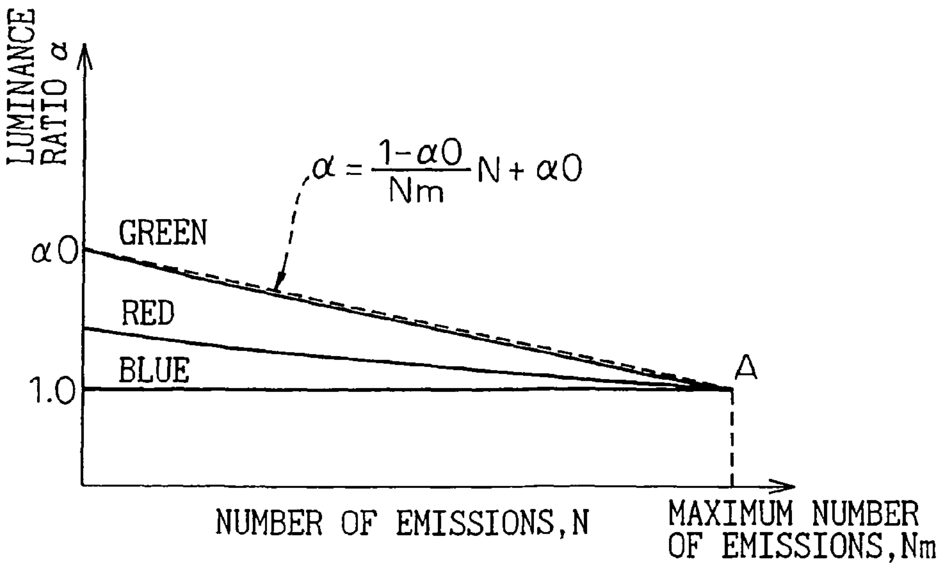
FIG. 7 is a diagram showing the luminance ratios of three primary color phosphors relative to the blue phosphor, plotted against the number of emissions.

FIG. 6 is a block diagram showing a first embodiment of the white balance correction circuit according to the present invention, and FIG. 7 is a diagram showing the luminance ratios of three primary color phosphors relative to the blue phosphor, plotted against the number of emissions.

In FIG. 6, reference numerals 11 to 13 are multipliers, 2 is a microcomputer, and 3 is an APL detection circuit (average picture level (display ratio) detection circuit). Reference characters Kr, Kg, and Kb are multiplication coefficients (amplitude coefficients) for the respective input video signals (three primary color digital video signals) R, G, and B.

As shown in FIG. 6, the white balance adjusting circuit of the first embodiment adjusts the white balance by adjusting the amplitudes of the input video signals R, G, and B by means of the multipliers 11 to 13 using the multiplication coefficients Kr, Kg, and Kb supplied from the microcomputer 2. The microcomputer 2 sets the number of emissions based on the APL (average picture level, i.e., the display ratio) obtained from the APL detection circuit 3. Further, the microcomputer 2 computes from the number of emissions the rate of change of the luminance ratio of each of R, G, and B (red, green, and blue) due to the change of the energy conversion efficiency and, by inversely correcting the rate of change, computes the multiplication coefficients Kr, Kg, and Kb so that the luminance ratio among red, green, and blue is maintained constant. The thus computed coefficients are supplied to the respective multipliers 11 to 13.

For example, consider the case where the white balance is initially adjusted when the number of emissions is largest, and the white balance is corrected relative to its initial value for various values of the number of emissions; in that case, if the luminance of blue is taken as the reference since the blue phosphor has the shortest persistence (that is, the energy conversion efficiency decreases least), the luminance ratios of red, green, and blue, when plotted against the number of emissions, exhibit the characteristics shown in FIG. 7. At this time, the change of the luminance ratio of green can be approximated by a linear equation $\alpha=(1-\alpha0)/Nm)\cdot N+\alpha0$, where $\alpha$ is the luminance ratio with respect to the blue phosphor, $\alpha0$ is the luminance ratio when the number of emissions is zero, N is the number of emissions, and Nm is the maximum number of emissions.

To maintain the white balance constant regardless of the number of emissions, the rate of change of the luminance ratio should be inversely corrected; therefore, the multiplication coefficient Kg can be calculated as the reciprocal of the luminance ratio a, i.e., $Kg=1/\alpha$. The multiplication coefficient for red (R) can be calculated similarly. This of course applies if the color used as the reference is changed. In this way, by supplying the multiplication coefficients Kr, Kg, and Kb thus calculated by the microcomputer 2 to the respective multipliers 1 to adjust the signal amplitudes, the luminance ratio and, hence, the white balance can be maintained constant regardless of the number of emissions. In this example, the approximation is performed using a linear equation, but if the approximation is done using an equation of higher degree, a higher correction accuracy can be achieved.

In the present embodiment, first, to determine the characteristics of the phosphors, the relationship between the number of emissions and the luminance is measured, and the number of emissions versus luminance characteristics, such as shown in FIG. 5A, is obtained. Then, from the measured data, the phosphor having the most linear characteristic (for example, the blue phosphor) is taken as the reference and, using this, the characteristics of the respective phosphors (red, green, and blue) are normalized and the luminance ratios are computed for various values of the number of emissions.

More specifically, using the blue phosphor as the reference, the luminance ratio of each phosphor to the blue phosphor is computed. When the luminances of red, green, and blue at point A are denoted by Lar, Lag, and Lab, respectively, and the luminances at a given number of emissions by Lr, Lg, and Lb, respectively, then the normalized results are as shown below. FIG. 7 shows the graphs (solid lines: red, green, and blue) plotted using the values calculated from the following equations.

$$\text{Luminance ratio of red to blue}=(Lr/Lar)/(Lb/Lab)$$

$$\text{Luminance ratio of green to blue}=(Lg/Lag)/(Lb/Lab)$$

To suppress the variation of the white balance due to changes in the number of emissions, the luminance ratio should be maintained constant regardless of the number of emissions. Therefore, the change of the luminance ratio is approximated by a linear equation (dashed line: green) as shown in FIG. 7 and, using its reciprocal (multiplication coefficient K), the corresponding video signal is multiplied to correct the white balance. That is, the multiplication coefficient K is calculated using the equation $K=1/\alpha=Nm/(N+\alpha0(Nm-N))$.

Figure 8:
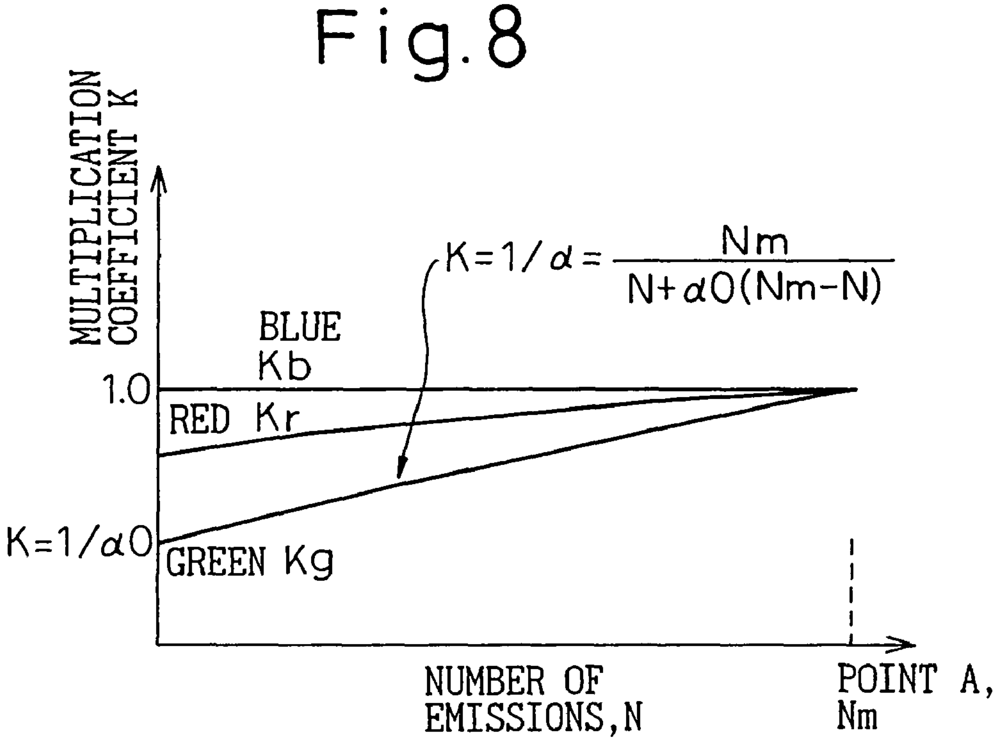
FIG. 8 is a diagram for explaining the multiplication coefficients for the three primary colors, red, green, and blue, used in the white balance correction circuit of FIG. 6.

FIG. 8 is a diagram for explaining the multiplication coefficients for the three primary colors, red, green, and blue, used in the white balance correction circuit of FIG. 6. The multiplication coefficients Kr, Kg, and Kb for red, green, and blue are plotted by calculating them from the equation $K=1/\alpha=Nm/(N+\alpha0(Nm-N))$. Here, reference character N represents the number of emissions, Nm the maximum number of emissions, and $\alpha0$ the luminance ratio at the minimum number of emissions.

The linear equation shown in FIG. 7 is determined for each phosphor; that is, if the phosphor is determined, the equation for it is also determined. Therefore, the equation for calculating its reciprocal (see FIG. 8) is programmed in advance into the microcomputer 2, and the multiplication coefficients are calculated with various values of the number of emissions by using the programmed equation.

Figure 9:
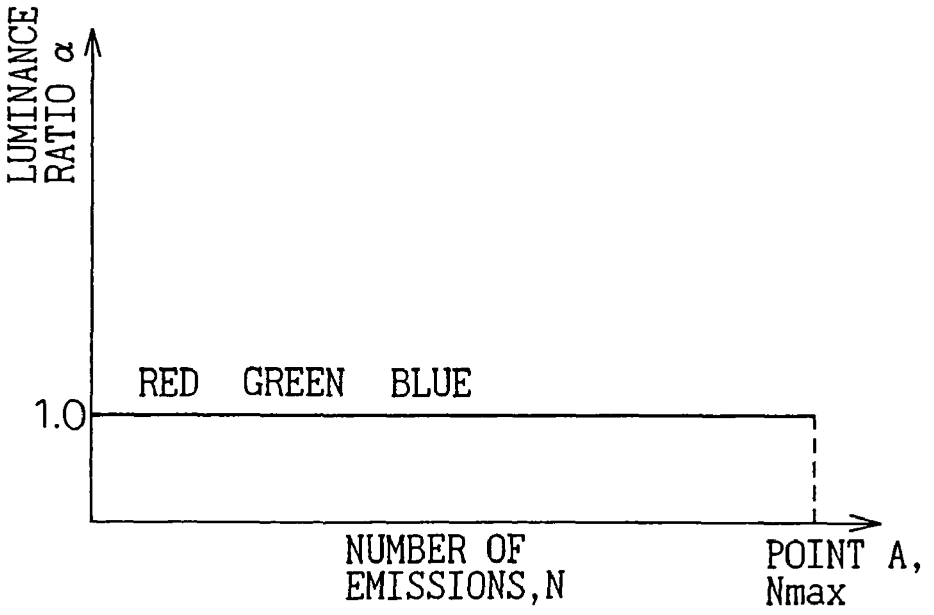
FIG. 9 is a diagram showing the luminance ratios of the three primary color phosphors corrected by the white balance correction circuit of FIG. 6, plotted against the number of emissions.

FIG. 9 shows the results of the multiplications performed using the multiplication coefficients calculated by the microcomputer 2, that is, the luminance ratios of the three primary color phosphors corrected by the white balance correction circuit of FIG. 6, plotted against the number of emissions. As is apparent from FIG. 9, for all the phosphors of red, green, and blue (three primary colors) the luminance ratio can be maintained constant regardless of the number of emissions, and hence, correct white balance can be maintained regardless of the number of emissions.

More specifically, assume for example that the luminances of green and blue at the maximum number of emissions are 200 $cd/m^2$ and 80 $cd/m^2$, respectively, and the luminances at the minimum number of emissions are 60 $cd/m^2$ and 20 $cd/m^2$, respectively.

At this time, the luminance ratio of blue to green at the maximum number of emissions is $$\text{Blue:Green}=80:200=1:2.5$$

Likewise, the luminance ratio of blue to green at the minimum number of emissions is $$\text{Blue:Green}=20:60=1:3$$

The luminance ratio of green to blue is therefore 1.2 (3/2.5); since this value is $\alpha 0$, the multiplication coefficient K as its reciprocal is $$K=1/\alpha 0=1/1.2=0.83$$

That is, the green video signal (G) is corrected by multiplying its signal amplitude by 0.83. The red video signal (R) is also corrected in like manner. In this way, by calculating the multiplication coefficients with various values of the number of emissions by using the previously given approximation equation, and by multiplying the video signals by the respective coefficients, correct white balance can be maintained regardless of the number of emissions.

Figure 10:
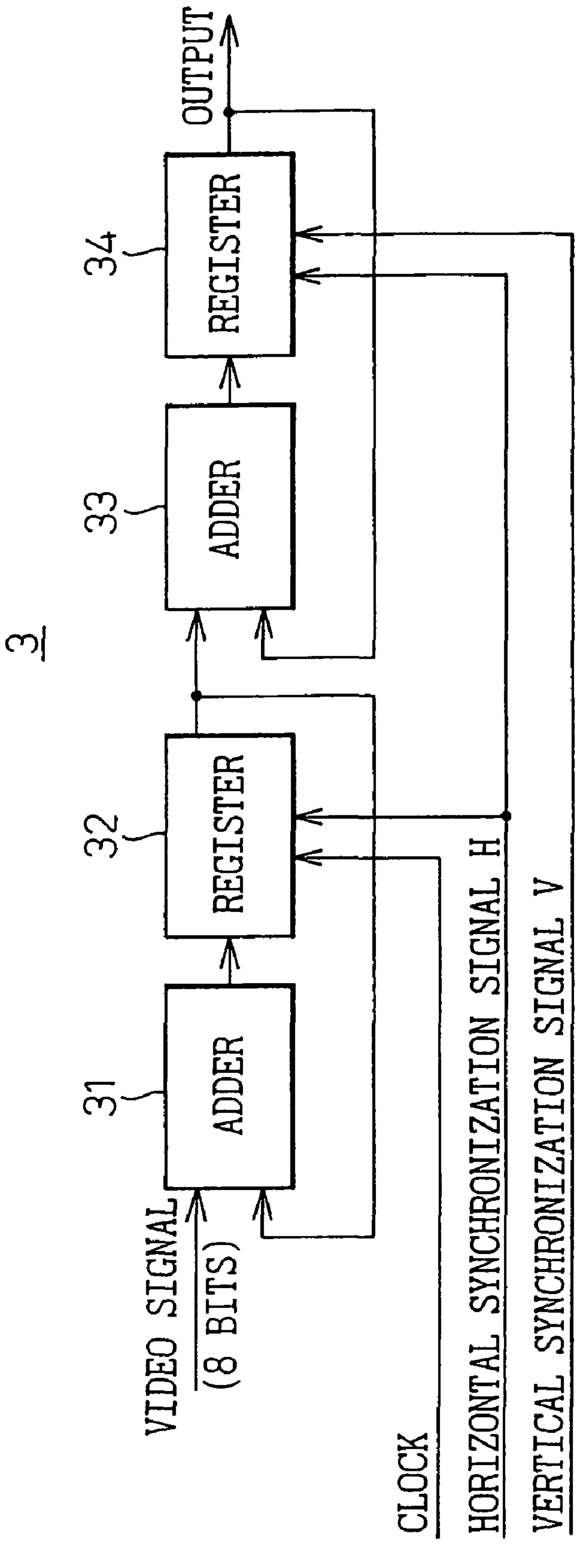
FIG. 10 is a block diagram showing one example of an APL detection circuit in the white balance correction circuit of FIG. 6.

FIG. 10 is a block diagram showing one example of the APL detection circuit 3 in the white balance correction circuit of FIG. 6. In FIG. 10, reference numerals 31 and 33 are adders, and 32 and 34 are registers.

As shown in FIG. 10, input video signals, for example, of eight bits are added in the adder 31, and a video output (luminance) for each line corresponding to a horizontal synchronization signal H is stored in the register 32. The output per line from the register 32 is added in the adder 33, and a video output for one frame corresponding to a vertical synchronization signal V is stored in the register 34. Then, the average picture level (display ratio) of the display image is computed. Any circuit designed to control the number of emissions according to the APL (display ratio) in order to reduce the power consumption of a display apparatus, for example, can be used as the APL detection circuit 3, and various configurations other than that described above are possible.

Figure 11:
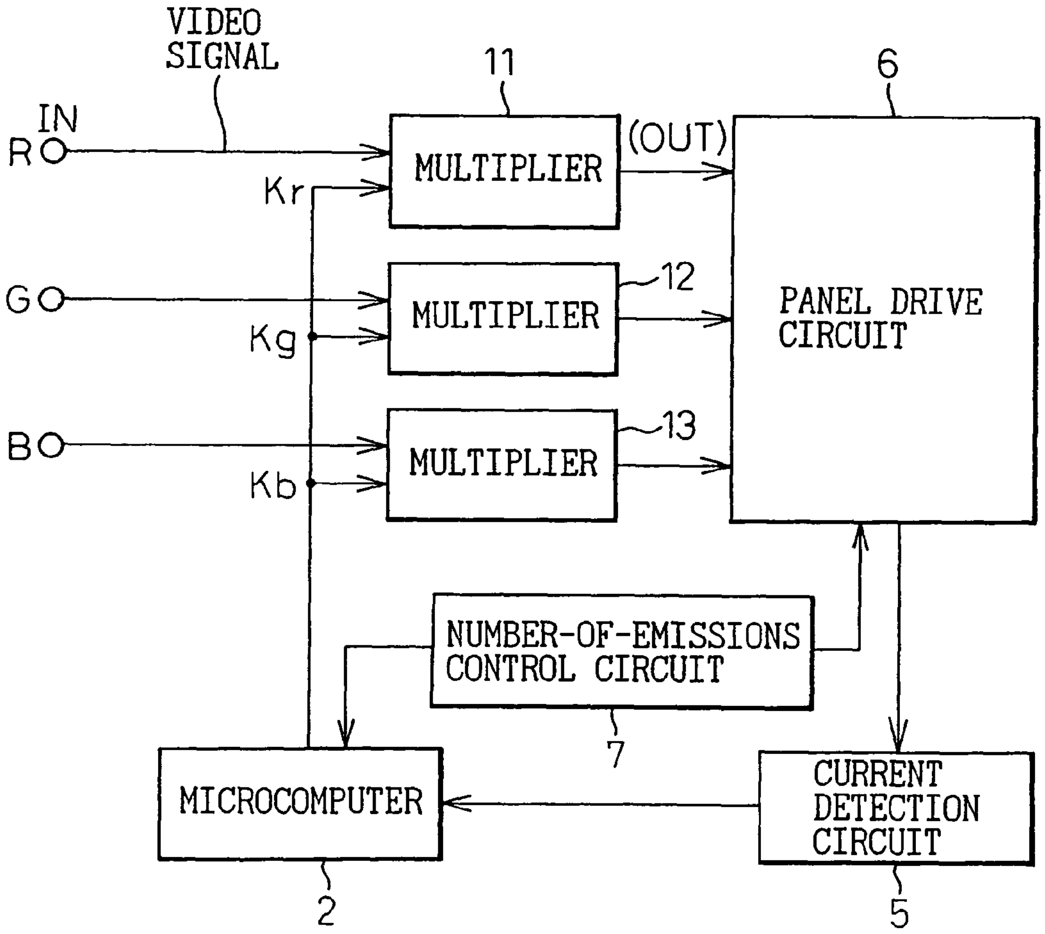
FIG. 11 is a block diagram showing a second embodiment of a white balance correction circuit according to the present invention.

FIG. 11 is a block diagram showing a second embodiment of the white balance correction circuit according to the present invention. In FIG. 11, reference numeral 5 is a current detection circuit, 6 is a panel drive circuit, and 7 is a number-of-emissions control circuit.

As shown in FIG. 11, the second embodiment of the present invention differs from the first embodiment shown in FIG. 6 in that the APL detection circuit 3 in the first embodiment is replaced by the current detection circuit 5; that is, the current detection circuit 5 detects the current consumption (display current) of the panel drive circuit 6, i.e., the display current corresponding to the display ratio used in the first embodiment, and based on the result of the detection, the microcomputer 2 calculates the multiplication coefficients. In the second embodiment, the number of emissions of each phosphor is controlled by the microcomputer 2 receiving the output of the current detection circuit 5 and controlling the number-of-emissions control circuit 7 so that the power consumption of the display apparatus is held below a predetermined value.

More specifically, the current detection circuit 5 detects the current being consumed by the panel drive circuit 6, and converts the current into a voltage value which is supplied to the microcomputer 2; based on the voltage value thus supplied, the microcomputer 2 reads the number of emissions from the number-of-emissions control circuit 7 and sets the number of emissions. Then, the microcomputer 2 computes the change of the luminance ratio due to the rate of change of the energy conversion efficiency corresponding to the thus set number of emissions, and calculates the multiplication coefficients K (Kr, Kg, and Kb) so that the luminance ratio among red, green, and blue is maintained constant. Using the multiplication coefficients Kr, Kg, and Kb, the multipliers 11, 12, and 13 multiply the respective video signals R, G, and B to adjust the amplitudes of the signals so that the white balance is maintained constant.

According to the second embodiment, the invention can be applied to a wide variety of display apparatuses including display apparatuses, such as CRTs, not equipped with an APL detection circuit.

Figure 12:
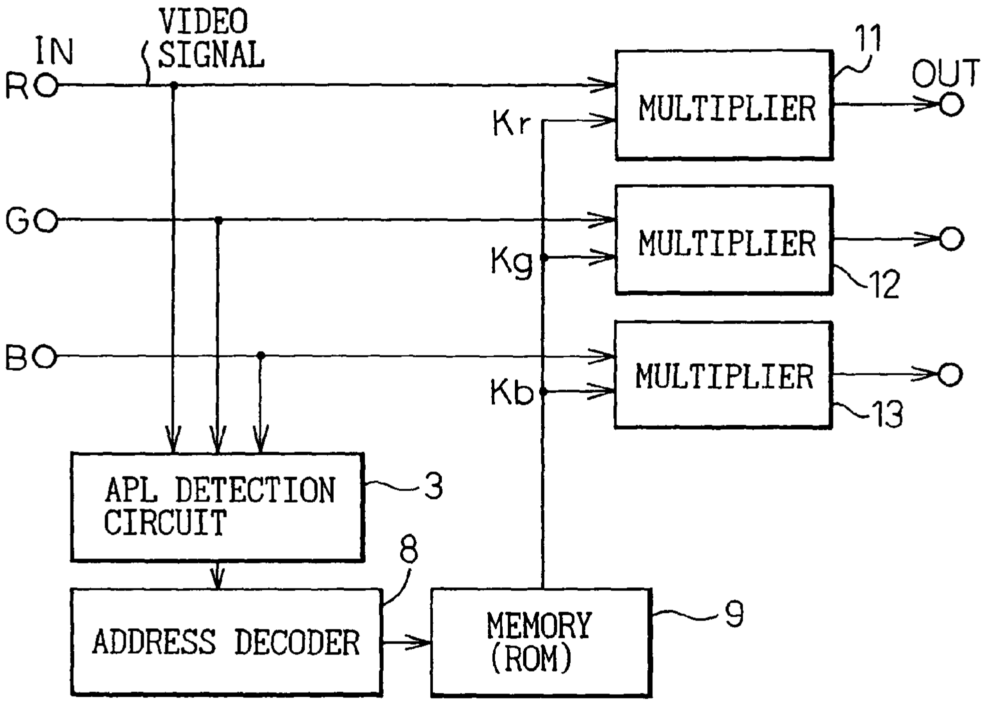
FIG. 12 is a block diagram showing a third embodiment of a white balance correction circuit according to the present invention.

FIG. 12 is a block diagram showing a third embodiment of the white balance correction circuit according to the present invention. In FIG. 12, reference numeral 8 is an address decoder, and 9 is a memory (read only memory—ROM).

As shown in FIG. 12, the third embodiment differs from the first embodiment shown in FIG. 6 in that the microcomputer 2 in the first embodiment is replaced by the address decoder 8 and ROM 9. In the ROM 9, the multiplication coefficients Kr, Kg, and Kb for the respective video signals are stored for various values of APL (display ratio), and the multiplication coefficients appropriate to the APL detected by the APL detection circuit 3 are output from the ROM 9.

More specifically, the APL detection circuit 3 detects the APL of the input video signals and supplies the result to the address decoder 8, and the address decoder 8 generates the address in the ROM 9 at which the multiplication coefficients corresponding to the detected APL are stored. In the ROM 9, the multiplication coefficients Kr, Kg, and Kb for correcting for the change of the luminance ratio due to the change in the energy conversion efficiency are prestored for various values of APL, that is, the number of emissions and, in accordance with the address supplied from the address decoder 8, the corresponding multiplication coefficients are output and supplied to the respective multipliers 11, 12, and 13.

According to the third embodiment, the white balance can be corrected sufficiently even in cases where the number of emissions and the multiplication coefficients Kr, Kg, and Kb cannot be approximated by simple equations (for example, when the energy conversion efficiency of each phosphor varies in a complex manner depending on the number of emissions).

In the third embodiment also, the APL detection circuit 3 may be replaced by the current detection circuit 5, as in the second embodiment, and similar control can be performed by detecting the display current (the current consumption of the panel drive circuit 6) instead of the display ratio.

Figure 13:
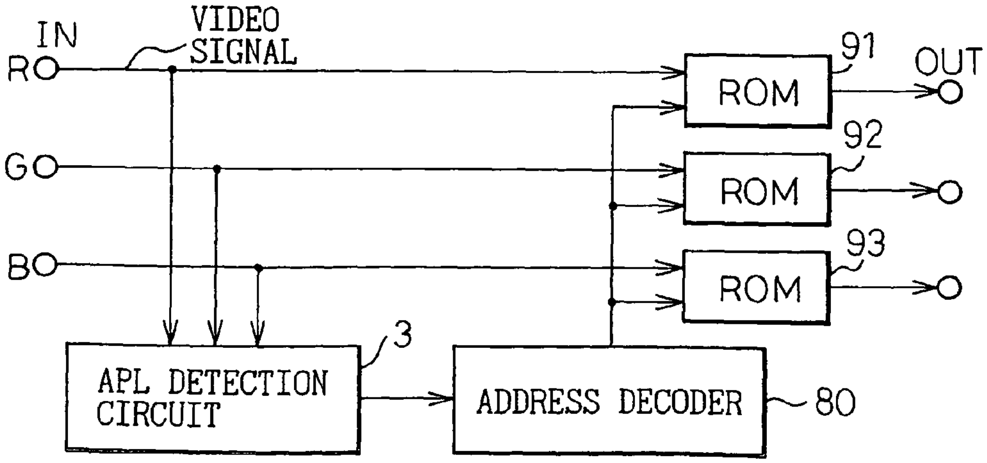
FIG. 13 is a block diagram showing a fourth embodiment of a white balance correction circuit according to the present invention.

FIG. 13 is a block diagram showing a fourth embodiment of the white balance correction circuit according to the present invention. In FIG. 13, reference numeral 80 is an address decoder, and 91, 92, and 93 are ROMs (memories).

As shown in FIG. 13, in the fourth embodiment, the ROM 9 and multipliers 11 to 13 in the third embodiment are replaced by ROMs 91 to 93; that is, the APL of the input video signals is detected by the APL detection circuit 3, and the detected value is converted by the address decoder 80 into the corresponding address in each of the ROMs 91 to 93. Data calculated by multiplying the respective video signals (R, G, and B) by given coefficients are prestored in the respective ROMs 91 to 93 to correct for the change of the luminance ratio due to the change in the energy conversion efficiency for various values of APL, that is, the number of emissions. Data stored in the respective ROMs 91, 92, and 93 are read out by using an address consisting, for example, of the address supplied from the address decoder 80 as the high-order bit address and each video signal as the low-order bit address, and based on the thus readout data, the amplitudes of the respective video signals are adjusted so that the luminance ratio among red, green, and blue is maintained constant.

According to the fourth embodiment, as in the third embodiment, the white balance can be corrected sufficiently even in cases where the number of emissions and the multiplication coefficients Kr, Kg, and Kb cannot be approximated by simple equations. Further, in the fourth embodiment also, the APL detection circuit 3 may be replaced by the current detection circuit 5, and similar control can be performed by detecting the display current instead of the display ratio.

Figure 14:
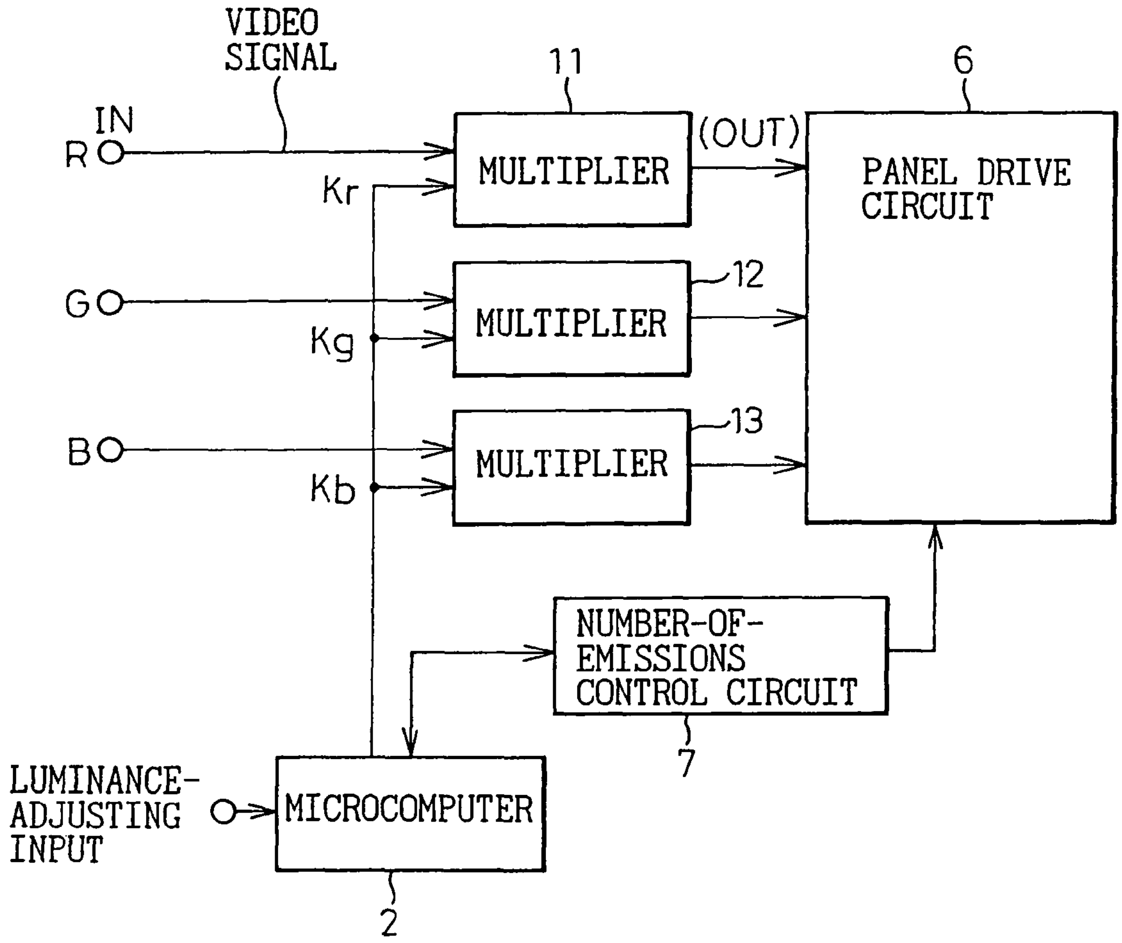
FIG. 14 is a block diagram showing a fifth embodiment of a white balance correction circuit according to the present invention.

FIG. 14 is a block diagram showing a fifth embodiment of the white balance correction circuit according to the present invention.

As shown in FIG. 14, a luminance-adjusting input from the outside (for example, the user) is supplied to the microcomputer 2 and, in accordance with this luminance-adjusting input, the luminance of the display image is set via the number-of-emissions control circuit 7 and via the panel drive circuit 6. In the fifth embodiment, from the number of emissions corresponding to the supplied luminance-adjusting input the microcomputer 2 computes the change of the luminance ratio due to the rate of change of the energy conversion efficiency for that number of emissions, and calculates the multiplication coefficients K (Kr, Kg, and Kb) so that the luminance ratio among red, green, and blue is maintained constant. Using the multiplication coefficients Kr, Kg, and Kb, the multipliers 11, 12, and 13 multiply the respective video signals R, G, and B to adjust the amplitudes of the signals so that the white balance is maintained constant.

The white balance correction based on the external luminance-adjusting input according to the fifth embodiment is independent, for example, of the white balance correction in any of the first to fourth embodiments which is performed by detecting the display ratio or the display current, and the white balance correction circuit may be constructed by combining the fifth embodiment with any one of the foregoing embodiments. For example, when the correction circuit is implemented by combining the fifth embodiment with the second embodiment shown in FIG. 11, the coefficients Kr, Kg, and Kb output from the microcomputer 2 have such values that serve to maintain the luminance ratio among red, green, and blue constant, considering the change of the luminance associated with the external luminance-adjusting input as well as the current consumption (display current) of the panel drive circuit 6 detected by the current detection circuit 5.

Figure 16:
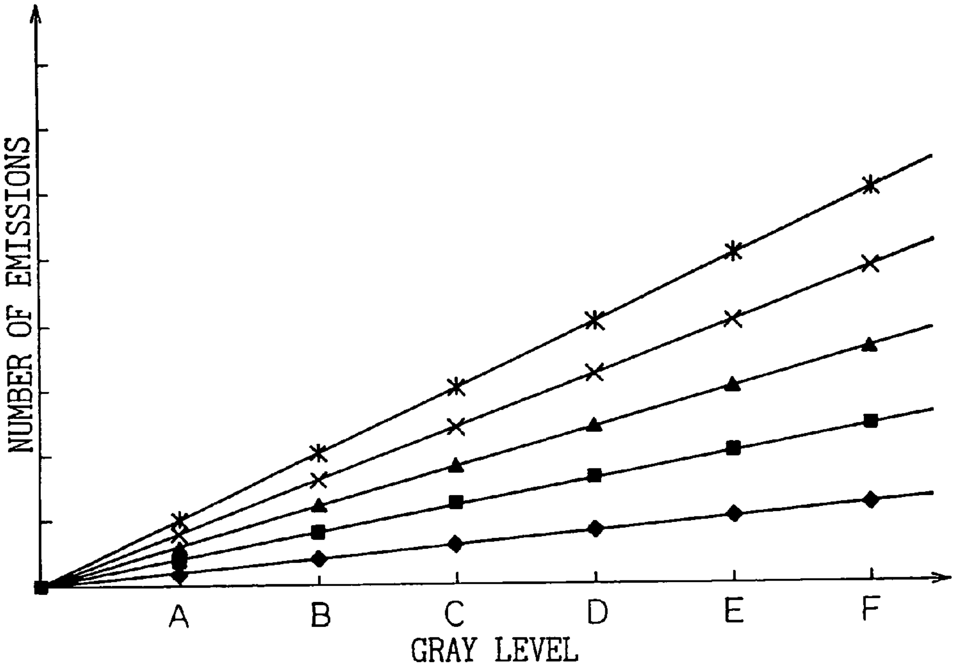
FIG. 16 is a diagram (part 2) showing the relationship between a gray level and a number of emissions.

FIGS. 15 and 16 are diagrams showing the relationship between a gray level and a number of emissions.

A technique is known that expresses different gray levels A to F of a plurality of input primary color video signals (for example, three primary color video signals R, G, and B) by different combinations of values of the number of emissions (processes P1 to P5, . . . ) as shown in FIGS. 15 and 16. This techniques, as in the above-described embodiments, detects either the display ratio or display current of the image produced by the input video signals and, based on the detected display ratio or display current, performs driving control so that, for example, the power consumption of the display apparatus as a whole does not exceed a predetermined value, while maintaining the gray levels A to F.

More specifically, when reference character F in FIGS. 15 and 16 represents 300 gray levels and C 150 gray levels, for example, if the display ratio of the image produced by the input video signals is high and there is a need to sufficiently reduce the power consumption in order to hold it below a specified value, the gray levels F and C are displayed using Ff (for example, 150 sustain emission pulses) and Cf (for example, 75 sustain emission pulses), respectively, in the driving process P1 where the drive current is small (the number of emissions as a whole is small). Conversely, if the display ratio of the image produced by the input video signals is extremely low, for example, the gray levels F and C are displayed using Ff×5 (for example, 750 sustain emission pulses) and Cf×5 (for example, 375 sustain emission pulses), respectively, in the driving process P5 where the drive current is large (the number of emissions as a whole is large). Similar processes are performed for other gray levels (A, B, . . . ). In this way, the display ratio (or the display current) of the image produced by the plurality of primary color video signals is detected, and the number of emissions or the intensity is controlled for the plurality of primary color video signals in accordance with the detected display ratio (or display current).

As previously described, in the prior art white balance adjusting circuit, to adjust the white balance, a prescribed adjustment pattern (for example, a window pattern or the like) is displayed with specified gray levels, and the signal amplitudes of the respective color video signals R, G, and B are adjusted so that the desired white balance can be obtained. However, when the white balance is adjusted (for example, only once prior to shipment from the factory) by displaying a prescribed adjustment pattern with specified gray levels, the white balance will be shifted if the gray levels (input gray levels) change.

Figure 17:
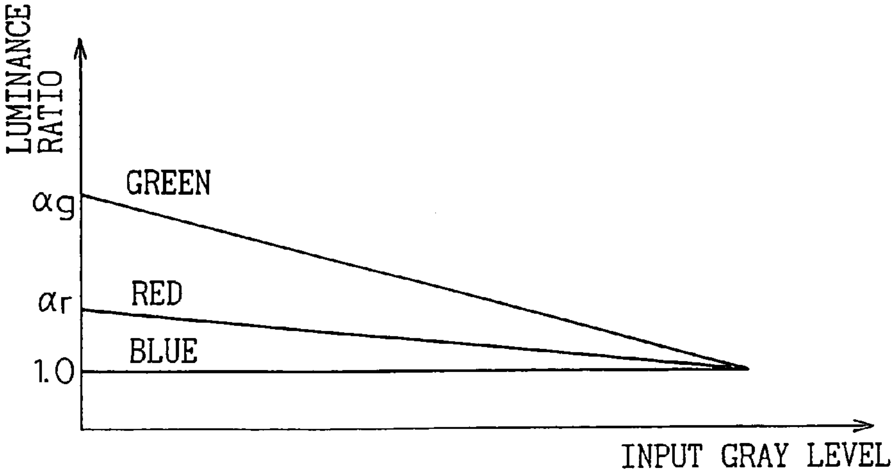
FIG. 17 is a diagram showing the relationship between a gray level and a luminance ratio for each of the three primary color phosphors of red, green, and blue.

FIG. 17 is a diagram showing the relationship between gray level and luminance ratio for each of the three primary color phosphors of red, green, and blue; the luminance ratio of each color at the maximum gray level, as measured relative to blue, is shown here. Further, FIG. 18 is a block diagram showing a sixth embodiment of the white balance correction circuit according to the present invention, FIG. 19 is a diagram for explaining the multiplication coefficients for the three primary colors, red, green, and blue, used in the white balance correction circuit of FIG. 18, and FIG. 20 is a diagram showing the relationship between gray level and luminance ratio for the three primary color phosphors when corrections are made by the white balance correction circuit of FIG. 18.

Figure 19:
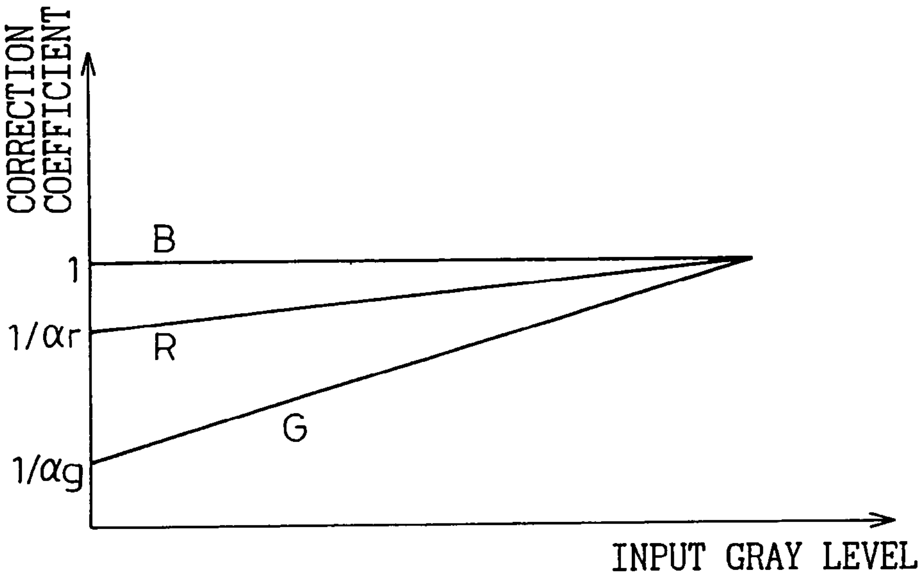
FIG. 19 is a diagram for explaining the multiplication coefficients for the three primary colors, red, green, and blue, used in the white balance correction circuit of FIG. 18.
Figure 20:
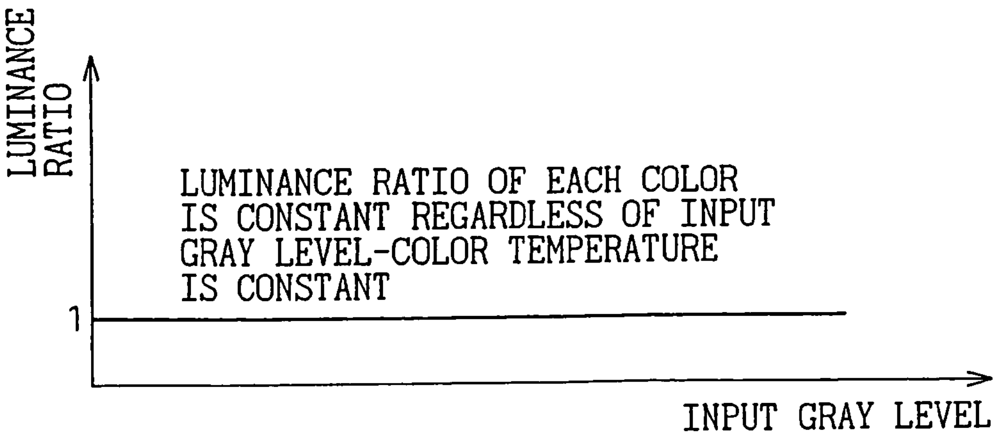
FIG. 20 is a diagram showing the relationship between a gray level and a luminance ratio for the three primary color phosphors when corrections are made by the white balance correction circuit of FIG. 18.

As is apparent from a comparison between the previously given FIGS. 7 to 9 and the above FIGS. 16,19, and 20, the relationship between the gray level (input gray level) and luminance ratio $\alpha$ of the three primary color phosphors in the sixth embodiment can be compared to the relationship between the number of emissions and the luminance ratio described in the first embodiment.

Figure 18:
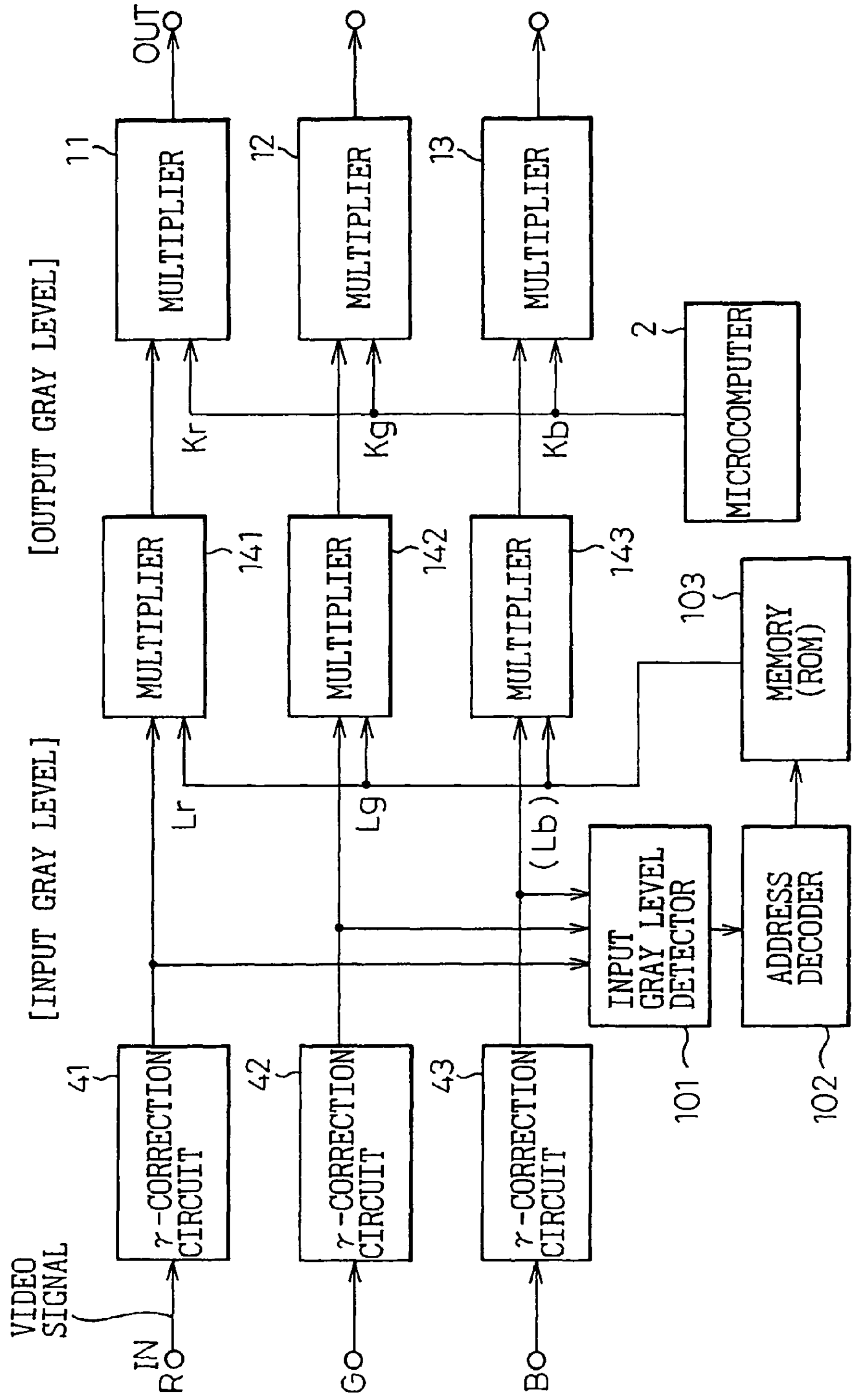
FIG. 18 is a block diagram showing a sixth embodiment of a white balance correction circuit according to the present invention.

In FIG. 18, reference numeral 11 to 13 are multipliers, 2 is a microcomputer, 41 to 43 are $\gamma$-correction circuits, 101 is an input gray level detector, 102 is an address decoder, 103 is a memory (ROM), and 141 to 143 are multipliers (output gray level correctors). The multipliers 11 to 13, the microcomputer 2, and the $\gamma$-correction circuits 41 to 43 are the same as those described in the prior art of FIG. 4, and the description of these elements will not be repeated here.

As shown in FIG. 18, in the white balance adjusting circuit of the sixth embodiment, the input gray levels of the input video signals R, G, and B are detected (recognized) by the input gray level detector 101, and in accordance with the result of the detection, correction coefficients Lr, Lg, and Lb are output via the address decoder 102 and memory 103. Each correction coefficient L has the relation L=1/α; hence, Lr=1/αr, Lg=1/αg, and Lb=1/αb.

Using the input correction coefficients Lr and Lg (Lb), the multipliers 141 and 142 (143) apply corrections in accordance with the following equation and calculate the output gray levels. In the equation, X is the input gray level, Y is the output gray level, and β is the maximum input gray level.

$$Y(X)=L+(1-L)\cdot(X/\beta)$$

Here, when the blue video signal is used as the reference (standard), since Lb=1/αb=1/1=1, there is no need to correct the input gray level of the blue video signal, and therefore, the multiplier 143 for the blue video signal need not be provided.

The sixth embodiment shown in FIG. 18 is configured so that the correction coefficients L for the detected input gray levels are output from the memory 103; however, the circuit may be configured so that the correction coefficients L for the input gray levels are computed using, for example, the microcomputer and the thus computed correction coefficients L are supplied to the respective multipliers (output gray level correctors) 141 to 143. Furthermore, the white balance correction circuit may be constructed using a microcomputer, etc. which also perform white balance corrections by adjusting the amplitudes of the respective video signals in accordance with the number of emissions or the intensity of emission as previously described.

Figure 21:
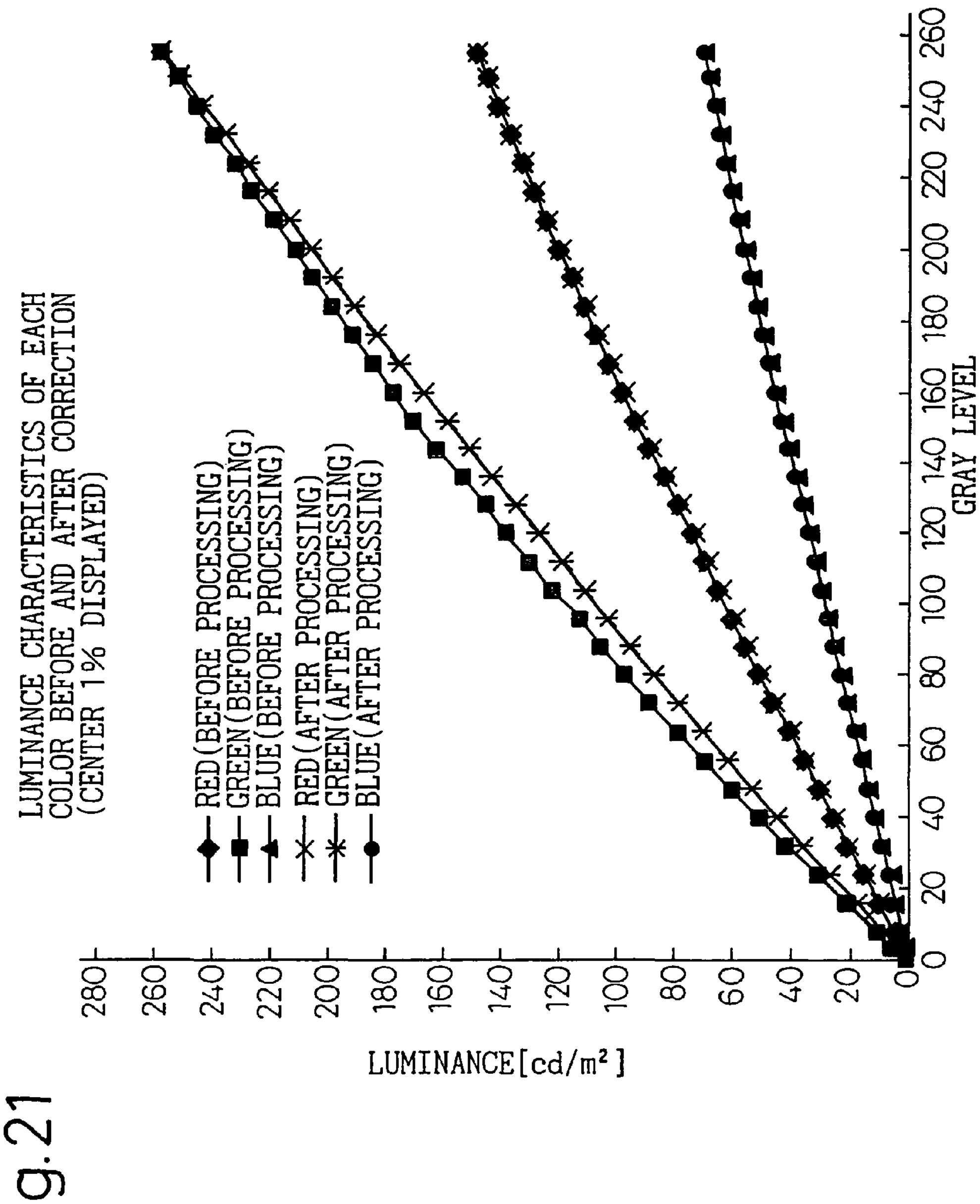
FIG. 21 is a diagram showing the luminance characteristics of the three primary color phosphors when the sixth embodiment of the white balance correction circuit, according to the present invention, is applied, in comparison with those when it is not applied.

FIG. 21 is a diagram showing the luminance characteristics of the three primary color phosphors when the sixth embodiment of the white balance correction circuit according to the present invention is applied, in comparison with those when it is not applied.

As is apparent from FIG. 21, when the sixth embodiment of the white balance correction circuit is applied, it becomes possible to maintain correct white balance, regardless of the gray level, by adjusting, for example, the variation of the white balance due to the gray levels of the red, green, and blue phosphors in such a manner that the luminance ratio is maintained constant.

Specific embodiments of the present invention have been described above by taking a plasma display apparatus as an example, but in other color display apparatuses (for example, CRTs, LED displays, etc.) using light emitting elements whose persistence characteristics differ among red, green, and blue, white balance can likewise be corrected by applying the present invention without modification except that the number of emissions is replaced by the luminance (intensity) of emission.

As described above, according to the present invention, correct white balance can be maintained regardless of the number of emissions or the intensity of emission.

Many different embodiments of the present invention may be constructed without departing from the spirit and scope of the present invention, and it should be understood that the present invention is not limited to the specific embodiments described in this specification, except as defined in the appended claims.

What is claimed is:

1. A display method of a plasma display apparatus carrying out color display by letting three primary color phosphors emit light in accordance with three input primary color video signals, the method comprising:

controlling a total number of sustain pulses to be applied in a frame in accordance with an average luminance level of the three primary color video signals for suppressing power consumption; and controlling output grey levels of at least two colors among the three primary color video signals in input of a signal having a predetermined grey level so as to make the output grey levels larger in a case that the total number of sustain pulses in accordance with the average luminance level is a second number larger than a first number than in a case that the total number of sustain pulses is the first number, and controlling the output grey levels, when the total number of sustain pulses is changed from the first number to the second number, so as to make a ratio of a change in the output grey level of a primary color video signal corresponding to a primary color of a phosphor, among the three phosphors, the energy conversion efficiency of which decreases most with increase in the number of emissions of the sustain pulses, larger than ratios of changes in the output grey levels of the other primary color video signals.

2. The display method of a plasma display apparatus according to claim 1, further comprising:

carrying out control, when the average luminance level of the image inputted to the plasma display apparatus is large, to reduce the total number of sustain pulses.

3. The display method of a plasma display apparatus according to claim 1, wherein altering the output grey levels of the primary color video signals is not changing the total number of sustain pulses to be applied in the frame but changing sub-frames to be lit in the frame.

4. A plasma display apparatus carrying out color display by letting three primary color phosphors emit light in accordance with three input primary color video signals, the apparatus comprising:

means for changing a total number of sustain pulses to be applied in a frame in accordance with an average luminance level of an input image;

output-grey-level adjusting means for altering the output-grey-level of the primary color video signals when the total number of sustain pulses in accordance with the average luminance level is changed from a first number to a second number larger than the first number, in accordance with the total number of sustain pulses so as to make output grey levels of at least two colors among the three primary color video signals in input of a signal having a predetermined grey level larger; and driving means for driving a plasma display panel by primary color video signals with the output grey levels adjusted by the output-grey-level adjusting means to display an image, wherein, when the total number of sustain pulses in the frame is changed from the first number to the second number, the output-grey-level adjusting means adjusts white balance of a display image by controlling the output grey levels so as to make a ratio of a change in an the output grey level of a primary color video signal corresponding to a primary color of a phosphor, among the three phosphors, the energy conversion efficiency of which decreases most with increase in the number of emissions of the sustain pulses, larger than ratios of changes in the output grey levels of the other primary color video signals.

5. The plasma display apparatus according to claim 4, wherein altering the output grey levels of the primary color video signals is not changing the total number of sustain pulses to be applied in the frame but changing sub-frames to be lit in the frame.

6. The display method of a plasma display apparatus according to claim 2, wherein the input three primary color video signal s are a red signal, a green signal, and a blue signal, the blue signal is a signal having the smallest decrease of the energy conversion efficiency with increase in the number of emissions of the sustain pulses, and even when the total number of sustain pulses is changed from the first number to the second number, a luminance ratio of three colors represented by the red signal, the green signal, and the blue signal is controlled so as to be a predetermined value.

7. The plasma display apparatus according to claim 4, wherein, the input three primary color video signals are a red signal, a green signal, and a blue signal, the blue signal is a signal having the smallest decrease of the energy conversion efficiency with increase in the number of emissions of the sustain pulses, and even when the total number of sustain pulses is changed from the first number to the second number, a luminance ratio of three colors represented by the red signal, the green signal, and the blue signal is controlled so as to be a predetermined value.

* * * * *

UNITED STATES PATENT AND TRADEMARK OFFICE

CERTIFICATE OF CORRECTION

PATENT NO. : 8,223,174 B2
APPLICATION NO. : 12/232680
DATED : July 17, 2012
INVENTOR(S) : Ken Kumakura et al.

It is certified that error appears in the above-identified patent and that said Letters Patent is hereby corrected as shown below:

Column 1, Line 13 (Approx.), delete “2000,now U.S.” and insert -- 2000, now --, therefor.
Column 18, Line 60, In Claim 4, after “in” delete “an”.
Column 19, Line 9 (Approx.), In Claim 6, delete “signal s” and insert -- signals --, therefor.

Signed and Sealed this
Second Day of October, 2012

David J. Kappos
*Director of the United States Patent and Trademark Office*